I. B. HARRIS.
MANUFACTURE OF FLEXIBLE AND OTHER TUBES, HOSE, &c.
No. 42,900. Patented May 24, 1864.
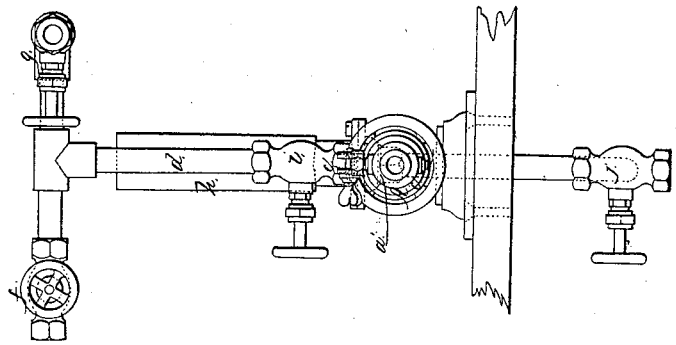
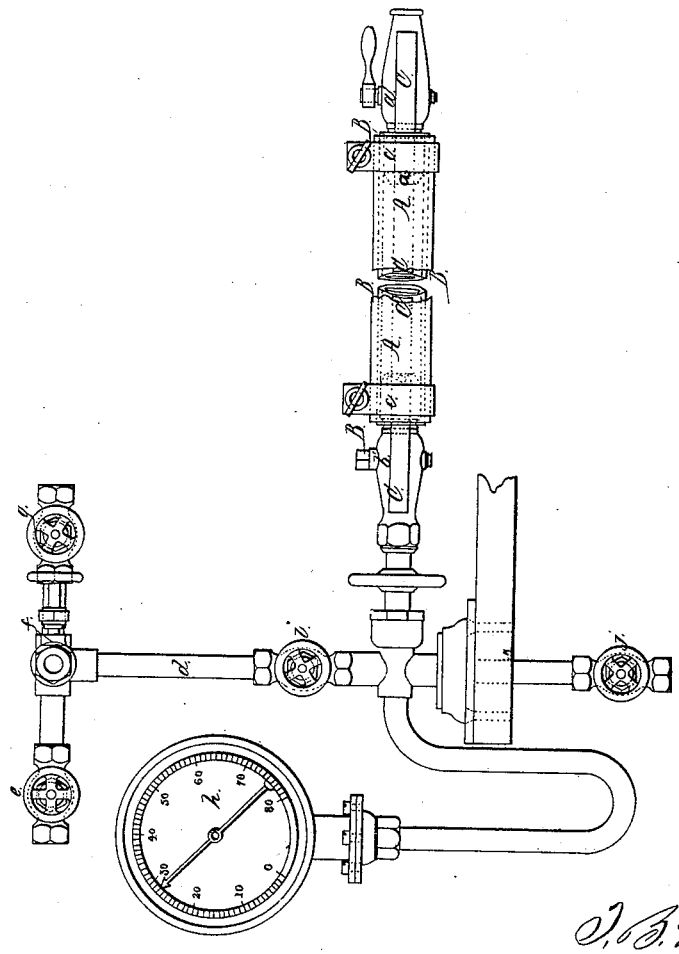
Witnesses:
And. Wallace
W. Stevenson
Inventor:
I. B. Harris

UNITED STATES PATENT OFFICE.

ISAAC B. HARRIS, OF CASTLE MILLS, FOUNTAIN BRIDGE, EDINBURGH, SCOTLAND.

MANUFACTURE OF FLEXIBLE AND OTHER TUBES, HOSE, &c.

Specification forming part of Letters Patent No. 42,900, dated May 24, 1864.

*To all whom it may concern:*

Be it known that I, ISAAC BLUE HARRIS, of the North British Rubber Company (limited) Castle Mills, Fountain Bridge, Edinburgh, Scotland, a citizen of the United States of America, have invented or discovered new and useful Improvements in the Manufacture of Flexible and other Tubes; and I, the said ISAAC BLUE HARRIS, do hereby declare the nature of the said invention and in what manner the same is to be performed to be particularly described and ascertained in and by the following statement thereof—that is to say:

It has before been proposed to employ water and other fluid to distend or expand a tube of india-rubber, when placed within a woven tube, and it has also been proposed to coat the woven tube exteriorly with india-rubber, and then, after removing the water or other fluid, to vulcanize the india-rubber.

Now, my invention has for its object improvements in the manufacture of flexible and other tubes; and it consists in producing a flexible water-proof tube or hose by lining and coating a woven tube with india-rubber, combined with sulphur, with or without other ingredients, in the following manner, which I hereinafter call the "india-rubber compound:"

Into a woven tube is placed a tube of somewhat smaller size and made of india-rubber composition suitable for vulcanizing. This inner tube is, as hereinafter explained, to be expanded by fluid-pressure and vulcanized; but before vulcanizing the inner tube it is preferred in most cases to apply a coating of india-rubber compound to the exterior of the woven tube or hose, for which purpose, while the tube is distended by fluid-pressure, a strip of india-rubber composition is lapped round the hose, and is caused to adhere thereto, sound joints being carefully made. The vulcanizing process is then effected while the hose is kept distended by fluid-pressure. Also, according to my invention, I line in a similar manner metal or other rigid tubes with vulcanized india-rubber. By similar means, also, flexible and other tubes may be coated and lined with vulcanite, the india rubber compound being somewhat modified and more heat employed. As is well understood by india rubber manufacturers, compounds of gutta-percha and sulphur may be substituted for or combined with india-rubber and sulphur, but not, I believe, so advantageously. I take, by preference, a common woven (seamless) hose, which should be well dried. It is passed through a friction-calender first on one side and then on the other, by which an exceedingly thin coat of india-rubber is laid upon the two sides, in the manner of spreading india-rubber to produce water-proof fabrics, and which enables the india-rubber cover of india-rubber compound to readily attach itself and remain permanently on the hose. This end may also be attained by applying india-rubber cement to the hose, but the "friction-coat" is preferred. A tube of india-rubber compound is made in the usual manner. This tube should be considerably less than the inside of the woven hose, to admit of its being easily passed or drawn through the woven tube. The woven hose, which is flat when it comes from the weaver, is passed or pushed through an iron pipe of somewhat greater diameter than itself. In doing so the stiffness of the woven tube causes it to open and assume the cylindrical form of a tube. A piece of tape is fixed into the tube, which is composed of india-rubber compound, when it is made, and which protrudes about one inch. A wire is introduced through the woven tube, and is caught into or attached to the piece of tape by a loop on the end of the india-rubber tube. By drawing the wire through the hose the india-rubber tube will follow it, and be thus readily pulled through the woven hose. This can be also accomplished by suspending the hose from an elevated position, and by lowering the india-rubber tube through it, using a weight to the lower end of the india-rubber tube when necessary.

Figure 1 of the drawings shows a side elevation, and Fig. 2 an end view, of apparatus used for carrying out my invention.

The woven hose A, with the india-rubber compound tube B inside, is drawn out of the interior of the iron pipe. The india-rubber tube B is gently expanded at its two ends by conical expanders until it has for the space of one to two inches attained the full size of the interior of the hose A. The ends of two hollow metal plugs $a$ and $b$, having cocks $a'$ $b'$, are then introduced into the ends of the india-rubber composition tube, and then exterior clamps, $c$, are put on the outside of the hose, so as to bind the ends of the hose securely to the plugs $a\,b$. The hollow metal plug $b$ is then coupled with a pipe, $d$, through which cold or warm water or steam can be supplied at pleasure. The cock $a'$, at the other end of the hose, is left open. The cold-water valve $e$ is then opened, (the steam-valve $f$ and hot-water valve $g$ being closed,) and the water rushes through the inner tube, driving the air before it out of the open cock $a'$ at the other end of the hose. As soon as the water comes out of the open cock $a'$, that cock is to be closed, and the inner tube receives the pressure of cold water. This should be at about five pounds pressure per square inch. The pressure of the water gently dilates the compound india-rubber tube without breaking it, and in a few minutes it will be found to have been expanded to the full size of the interior of the woven hose or tube. The cold-water valve $e$ is then to be shut, and the cock $a'$, in the farther end of the hose, is to be opened. The steam-valve $f$ is then to be opened, and steam will then rush through the hose, driving the cold water out, and as soon as the steam appears at the open cock $a'$ this cock is closed, and the steam-valve $f$ is kept so as to give a pressure of about forty pounds to the square inch.

$h$ is a pressure gage by which may be readily ascertained the pressure at which the water or steam is maintained.

$l$ is the valve through which communication may be made (or broken) with the gage $h$ when the cocks $a'$ and $b'$ are closed.

$j$ is a drip-valve for drawing off the water of condensation or otherwise from time to time. The inner tube becomes softened by the heat, and as it is pressed on by the steam its outer surface is driven well into the inner surface of the woven hose, at the same time the air which was between the inner tube and the hose is drawn through the hose. This pressure of steam is allowed to remain from twenty to thirty minutes. The cock $a'$ at the farther end of the hose, is then opened, the steam-valve $f$ is to be shut, and the warm-water valve $g$ opened. As soon as the warm water shows itself, the open cock $a'$ is to be closed and the pressure of warm water increased until the hose becomes firm and hard, as if on a solid mandrel. While under this pressure the cocks $a'$ $b'$ are closed and the whole is detached from the system of water and steam pipes and taken to another table. A strip of india-rubber compound the length of the hose is then laid on the table, and the hose is rolled onto it. This strip is wide enough to embrace the hose and to form an outer cover. Or the covering-strip may be applied spirally around the outside of hose, care being taken that the edges of the strip so come together as to make a good joint or seam. The better plan is to lay the hose on the table and to roll the cover on it by turning the hose as the rolling progresses.

Care is taken in covering the hose to exclude all air from between the cover and the hose, and the surface is carefully rolled with a small hand-roller as the covering progresses. The warm water inside the hose serves to soften the thin external coat of india-rubber, which was put on by the calender, so that the cover of india-rubber compound readily adheres to it, while the pressure of the water distends the hose so as to allow the hand-roll to be used in rolling on the cover. The covering operation being complete, one of the cocks, $a'$ or $b'$, is to be opened, and about half the water is to be allowed to escape, when the cock is again to be shut, care being taken to allow no air to enter while drawing off the water. The hose is now ready to be vulcanized or cured. This may be done by any of the well known means. The preferable method is to put hose into a curing-heater of somewhat greater length than the hose, in order not to coil the hose. When the heater is closed, the heat is to be raised gradually for one hour until it reaches about 300° Fahrenheit. After standing about thirty minutes at 300° the hose is withdrawn, the cocks $a'$ $b'$ are to be opened, and the water entirely discharged. During the process of vulcanization the high heat vaporizes the water within the hose and creates a pressure which keeps the hose distended, and the inner and outer covering are vulcanized in that much desired shape. The clamps $c$, at each end, are now unscrewed, and the plugs $a$ $b$ are withdrawn. The ends which the plugs and clasps held are cut off, and the hose, after being dried and coiled up, is ready for the market. By this process there is obtained a strong, seamless, flexible hose lined inside and outside with vulcanized india-rubber, cylindrical in form and lighter and cheaper than if made as heretofore practiced. By the various expanding processes the air is got rid of between the inner tube and the hose, which would otherwise "blow up" during the vulcanization. In case spiral wire is required inside the hose—such as is usually the case in "suction-hose"—the wire is wound upon an iron or other mandrel of such diameter that the whole is smaller than the inside of the hose. The ends of the wire are to be secured to the mandrel so that the wire is held tight on the whole length of the mandrel. The mandrel, with the wire on it, is then introduced through the vulcanized hose, constructed as above described, and the ends of the wire are to be let go. The whole length of the spiral wire then springs away from the mandrel and presses hard against the inside of the hose. The mandrel may then be withdrawn, leaving the wire in the hose.

The wire may be first coated with india-rubber, if so desired, for special uses.

In coating the inside of metal or other rigid tubes or pipes the india-rubber composition tube is drawn or introduced through the pipe or tube in any convenient way. Plugs, as above described, are used to secure the ends and connect one of them with water and steam supply pipes, as already described. The tube is distended by cold water, and this is followed by the steam under pressure. The metal pipe during this operation is, by preference, kept upright. The water flows in first at the bottom or lower end, and distends the india-rubber tube. The air is gradually worked out from the exterior of the inner tube at the top through a very small hole made in the outer pipe or tube close to the plug. When the water has fully distended the india-rubber tube against the inside of the iron or other pipe or tube, and the air has been expelled from between the inner tube and the outer pipe or tube, the steam is admitted. The vulcanization can then be carried on at once by allowing the steam to remain at a pressure of about sixty pounds on the square inch for about the same length of time as above described for the curing of the hose. After removal of the plugs the interior will be found thoroughly vulcanized and adhering firmly to the inside of the metal pipe.

I would remark that the degrees of pressure and heat and the times during which the pressure and heat are maintained may be varied to some extent according to the sizes of hose or pipes or tubes and other circumstances, as the manufacturer will readily understand, and according as it is desired to produce a vulcanized or vulcanite lining.

What I claim is—

1. The causing of india-rubber composition tubes, when in combination with woven or other tubes, to be vulcanized or to be converted into vulcanite while subjected internally to the pressure of fluid, substantially as herein described.

2. The combination of mechanical parts $a\ b\ c\ d\ e\ f\ g\ h\ i\ j$, substantially as above described.

J. B. HARRIS.

In presence of—
AND. WALLACE,
Of No. 19 Pilrig Buildings, Edinburgh, Clerk.
W. STEVENSON,
Of No. 6 Union Street, Edinburgh.